United States Patent
Drabon et al.

(10) Patent No.: US 11,787,276 B2
(45) Date of Patent: Oct. 17, 2023

(54) ELECTRIC VEHICLE WITH AXLE MODULES

(71) Applicant: BENTELER AUTOMOBILTECHNIK GMBH, Paderborn (DE)

(72) Inventors: Rodscha Drabon, Salzkotten (DE); Hendrik Reineke, Bad Driburg (DE); Eiko Schmidtke, Paderborn (DE); Peter Auer, Paderborn (DE); Jonathan Behm, Paderborn (DE); Eugen Lepp, Salzkottenj (DE); Ivo Kletetzka, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 148 days.

(21) Appl. No.: 17/394,518

(22) Filed: Aug. 5, 2021

(65) Prior Publication Data
US 2022/0041042 A1    Feb. 10, 2022

(30) Foreign Application Priority Data
Aug. 5, 2020  (DE) ...................... 10 2020 120 690.9

(51) Int. Cl.
*B60K 1/02* (2006.01)
*B60K 1/04* (2019.01)
(Continued)

(52) U.S. Cl.
CPC ................ *B60K 1/02* (2013.01); *B60G 11/08* (2013.01); *B60K 1/04* (2013.01); *B60L 58/26* (2019.02);
(Continued)

(58) Field of Classification Search
CPC .... B60K 2001/0411; B60K 2001/0416; B60L 50/66
See application file for complete search history.

(56) References Cited

U.S. PATENT DOCUMENTS 9,302,723 B1 *   4/2016  Pollitzer ............... B60T 13/741
10,737,737 B2 *  8/2020  Birnschein ......... B60H 1/00642
(Continued)

FOREIGN PATENT DOCUMENTS

| DE | 102010043901 A1 * | 5/2012 | ............... B60K 1/00 |
| DE | 102018214288 A1 | 2/2020 | |
| WO | 2018222375 A1 | 12/2018 | |

OTHER PUBLICATIONS

Office Action for German Application No. 10 2020 120 690.9 dated Jun. 24, 2021; 16pp.

*Primary Examiner* — Jeffrey J Restifo
(74) *Attorney, Agent, or Firm* — HAUPTMAN HAM, LLP

(57) ABSTRACT

The disclosure relates to an electric vehicle for the transportation of persons and/or loads, having a frame structure and axle modules which are coupled to the frame structure, a front axle module and a rear axle module, to which in each case the wheels are coupled kinematically, at least one of the axle modules having a drive and an energy source. One of the axle modules has four suspension points for the attachment by means of elastic bearings to the frame structure, in each case, two suspension points forming a pair, and the pairs lying at different heights in the motor vehicle vertical direction.

12 Claims, 3 Drawing Sheets

(51) Int. Cl.
   *B60L 58/26*     (2019.01)
   *B60G 11/08*     (2006.01)
   *B60K 1/00*      (2006.01)

(52) U.S. Cl.
   CPC ............... *B60K 2001/001* (2013.01); *B60K 2001/0405* (2013.01)

(56) References Cited

U.S. PATENT DOCUMENTS

| | | | |
|---|---|---|---|
| 2013/0240273 A1* | 9/2013 | Langer | H01M 50/249 180/55 |
| 2016/0297289 A1* | 10/2016 | Ito | B60K 1/02 |
| 2016/0347159 A1* | 12/2016 | Perlo | B60K 17/348 |
| 2018/0345777 A1* | 12/2018 | Birnschein | B62D 21/11 |
| 2018/0345971 A1* | 12/2018 | Birnschein | B60W 10/08 |
| 2020/0152933 A1* | 5/2020 | Thurmeier | H01M 50/204 |
| 2020/0220129 A1* | 7/2020 | Thurmeier | H01M 50/278 |
| 2020/0238814 A1* | 7/2020 | Kodama | B60K 5/1208 |
| 2022/0041042 A1* | 2/2022 | Drabon | B60L 50/60 |
| 2022/0048564 A1* | 2/2022 | van den Brink | B60L 7/10 |
| 2022/0314766 A1* | 10/2022 | Cavnic | F16F 1/38 |
| 2022/0348065 A1* | 11/2022 | Harmon | B62D 27/065 |
| 2022/0348275 A1* | 11/2022 | Harmon | B62D 21/11 |
| 2022/0388385 A1* | 12/2022 | Okonogi | H01M 50/262 |

\* cited by examiner

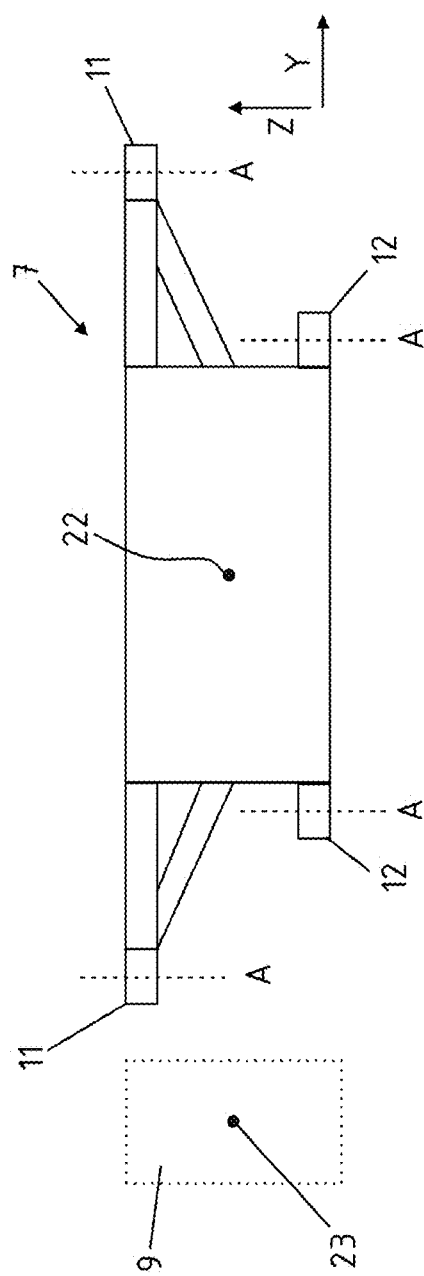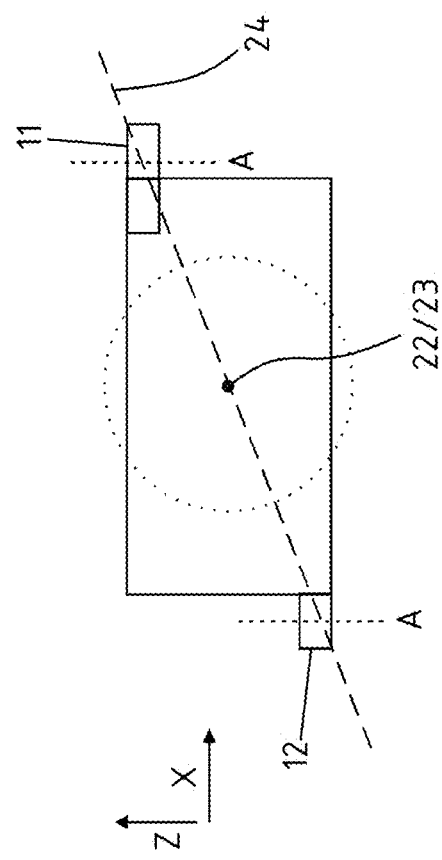

ELECTRIC VEHICLE WITH AXLE MODULES

CROSS-REFERENCE TO RELATED APPLICATIONS

The present application claims priority of German Application Number 10 2020 120 690.9 filed Aug. 5, 2020, the disclosure of which is hereby incorporated by reference herein in its entirety.

FIELD

The present disclosure relates to an electric vehicle for the transportation of persons or loads.

BACKGROUND

Here, electric energy is used to drive an electric motor vehicle. There are novel concepts here which differ from motor vehicles to be operated by a single driver. Vehicles of this type are also called people movers. The aim here is for a plurality of persons or goods to be transported as comfortably as possible, especially in the inner city area.

A people mover of the generic type is known, for example, from WO 2018/222375 A1.

There are a vehicle body and a chassis here. Axle modules are coupled to the chassis itself. An electric vehicle of this type can drive in both directions. Consequently, a classic forward and reverse driving direction is no longer applicable.

The aim is to have as small a ground clearance as possible, in order to make entry and exit for a plurality of persons easy in what is known as the low-floor area and/or to facilitate the access for people with a physical impairment. As an alternative or in addition, the volume which is available in the interior compartment can be maximized accordingly, especially in the case of goods transportation.

SUMMARY

It is an object of the present disclosure to improve the driving comfort of an electric motor vehicle of the generic type and, at the same time, to retain a modular construction.

The electric vehicle is provided for the transportation of persons and/or loads, and has a frame structure. A frame structure can also be called a chassis frame or a cabin frame. This is a frame structure which is constructed in a lattice-like manner from profiles. The frame structure or the frame structure can then be clad from the outside with windows and/or side walls, and roof panels and an underbody. In this way, the electric vehicle can be produced in as inexpensive a manner as possible. At the same time, a great interior compartment variability can be ensured and, at the same time, high crash safety can also be ensured by way of a torsional rigidity even of the frame. In addition, the weight of the electric vehicle is low. The frame can be produced from steel and/or aluminum profiles.

Axle modules are coupled to the frame structure. For differentiation purposes, one axle module is called a front axle module and one axle module is called a rear axle module. A forward driving direction and reverse driving direction can be configured substantially similarly with regard to speed, steering behavior and further kinematic properties.

The wheels are in each case coupled kinematically to the axle module. This takes place via wishbones; a MacPherson suspension system can also be used, that is to say a lower wishbone and a MacPherson damper strut. For example, however, the suspension can also take place via double wishbones. A transverse leaf spring is used.

At least one of the axle modules has/have a drive and an energy source. In at least one embodiment of the disclosure, wheel hub motors are used as a drive. There is likewise, as energy source, a corresponding battery housing or a battery pack (also called a battery tray) which is arranged centrally in the axle module. The battery housing itself is an integral constituent part of the axle module. As a result, in conjunction with the wheel hub motors, a compact and simple modular overall design can be ensured. The axle module merely has to be coupled to the frame structure and has to be connected electrically and/or in terms of cooling technology. The driving function is provided as a result. The axle module can have a crash management system, with the result that, for example, a crossmember is arranged via crash boxes on the axle module itself.

In at least one embodiment, at least one of the axle modules has four suspension points for the attachment by means of elastic bearings to the frame structure. Here, in each case two attachment points form a pair. The pairs themselves are arranged at different levels in the motor vehicle vertical direction.

In this way, a decoupling from the frame structure takes place on account of the elastic bearing system. As a result, the driving comfort, such as the interior compartment vibration and therefore also, contingent on this, interior compartment noise, is improved considerably. On account of the kinematic arrangement of the suspension points, at different heights in relation to the motor vehicle vertical direction, the attachment strength with simultaneous crash safety and torsional rigidity applied in the case of a drive or brake torque is improved considerably, which likewise has an effect on the driving comfort.

In at least one embodiment, a frame which runs around on the top is configured on the axle module. The frame itself is provided for the purpose of forming and/or receiving a battery box. Arranging of batteries can be carried out in the battery box. The batteries can also be arranged above one another in two layers or else in three layers or in multiple layers.

As a result, the interior compartment of the electric vehicle itself is maximized, since the installation space requirement for the drive, the energy source and the kinematic wheel suspension system is arranged in an optimized manner which is compressed in a respective axle module.

The upper pair of the suspension system is configured on a corresponding supporting structure which is coupled to the frame which runs around on the top. Said supporting structure is arranged approximately at the level of an upper side or an upper termination of the axle module.

The second pair of attachment points is then arranged, in the motor vehicle longitudinal direction, on a side which lies opposite.

The axle module has an axle subframe. The axle subframe forms the underside or is arranged below the axle module. The lower suspension points are then arranged on the axle subframe. The lower suspension points lie at the level of an underside of the axle module. In the motor vehicle vertical direction, the lower axle is situated below the upper suspension points.

According to at least one embodiment, a connecting line from an upper suspension point to a lower suspension point intersects the wheel center point. This is to be understood to mean firstly that the wheel center point itself is actually intersected. This is also to be understood, however, in such a way that, as viewed in a side view, that is to say as viewed in a side view in the motor vehicle lateral direction or motor vehicle transverse direction, the wheel center point and/or the center of mass of the battery carrier can lie at the level of the straight lines through the two suspension points. According to the disclosure, an improved driving behavior and driving comfort can be achieved; vibrations are compensated for by way of this, as a result of which a resonant behavior or another unnecessary increase of driving influences might not occur at all.

BRIEF DESCRIPTION OF THE DRAWINGS

Further advantages, features, properties and aspects are the subject matter of the following description are shown in diagrammatic figures which serve for the simple comprehension of the disclosure and in which:

FIG. 4 and FIG. 5 show a side view and front view of a basic construction of a front axle module according to at least one embodiment.

DETAILED DISCLOSURE

Figure 1:
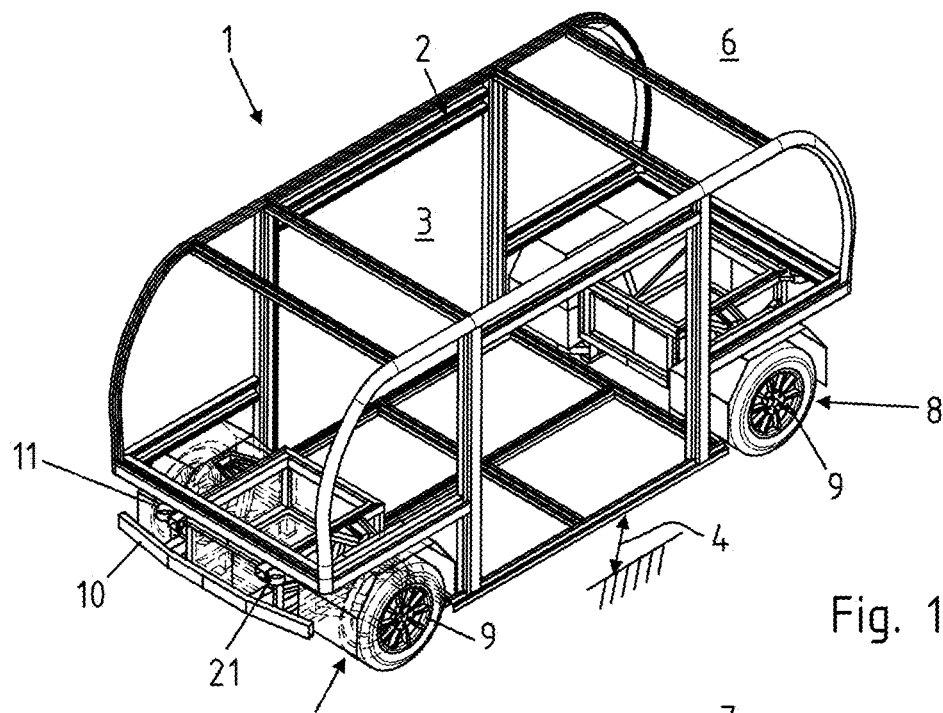
FIG. 1 shows a perspective view of an electric vehicle according to at least one embodiment.

FIG. 1 shows an electric vehicle 1 according to the disclosure in the form of a people or carry mover.

A frame structure 2 is shown which is produced from profiles. This results overall in a relatively large interior compartment 3 which can also be called a passenger compartment. The vehicle 1 has a small ground clearance 4 in the region of the low floor, with the result that simple lateral entry and exit are made possible. The driving direction of the vehicle 1 itself can be of identical configuration in both directions. For the sake of simplicity, however, a front side 5 and a rear side 6 are now shown. A front axle module 7 is arranged on the front side 5, and a rear axle module 8 is arranged on the rear side 6. Wheels 9 are coupled kinematically to the respective axle module 7, 8, with the result that a rebound and compression operation can take place, in order to provide corresponding driving comfort. A front crossmember 10 is shown which configures a crash management system, in order to absorb crash energy in the case of a collision.

Suspension takes place on the frame structure 2 via four suspension points 11 in a manner which is described here by way of example on the front axle module 7, but possibly also for the rear axle module 8. In each case, two suspension points 11 are combined to form a pair. In the motor vehicle vertical direction Z, the front upper suspension points 11 are arranged at a higher level than the rear suspension points 12 which lie below them in the motor vehicle vertical direction Z. An elastomeric rubber bearing is arranged on the respective suspension points 12, via which elastomeric rubber bearing the respective suspension point 11, 12 is coupled to the frame structure 2.

Figure 2:
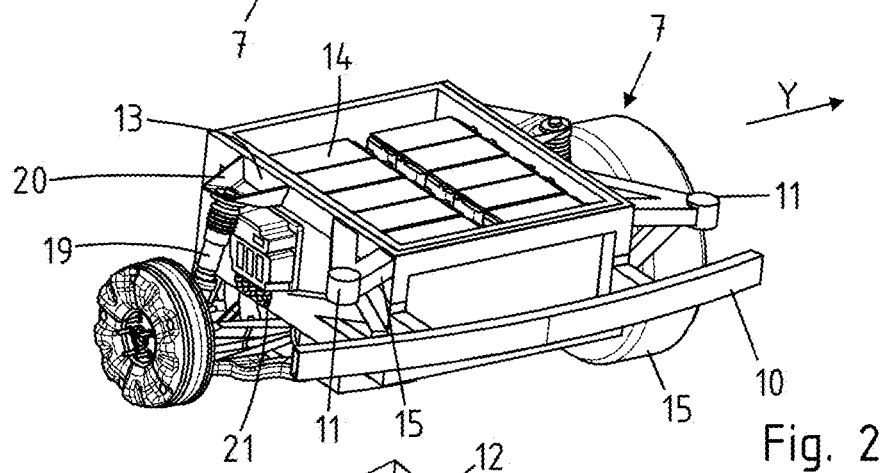
FIG. 2 and FIG. 3 show perspective views of a front axle module according to at least one embodiment.
Figure 3:
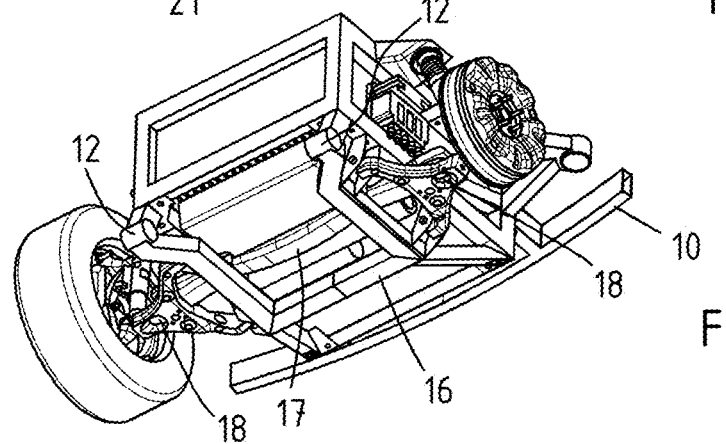

The front axle module 7 is shown in a perspective frontal view in FIG. 2 and in a perspective view from below in FIG. 3. The front axle module 7 has a circumferential frame 13. In this case, the frame 13 itself also configures a battery carrier, for receiving batteries 14. The battery carrier is therefore an integral constituent part of the front axle module 7. Arms 15 which project laterally in the motor vehicle transverse direction Y are arranged on the frame 13 itself. An axle subframe 16 is configured on the underside. The axle subframe 16 likewise forms an integral constituent part of the front axle module 7. A transverse leaf spring 17 is arranged. Via the latter, wishbones 18 are coupled to the axle subframe 16 here. A damper strut 19 is arranged on a strut bearing 20, the strut bearing 20 being fastened to the frame 13. An electronic power system 21 is configured, for example, in the form of an on-board charger. In a manner which is not shown in greater detail, a cooling system can be a constituent part of the front axle module 7, for example. Optional wheel hub motors are shown which drive the wheels 9.

FIG. 4 and FIG. 5 show a diagrammatic front view and side view, respectively, of the front axle module 7. The center of mass 22 of the batteries 14 and the battery carrier, and the wheel center point 23 of a wheel 9 are illustrated according to FIG. 4. The upper suspension points 11 and the lower suspension points 12 which lie below them in the motor vehicle vertical direction Z are shown in each case as a pair. It is likewise illustrated that an axial direction A of the bearings is arranged in a manner which is oriented in the motor vehicle vertical direction Z. In the case of the use of rubber/metal bearings in the suspension points 11, 12, a support can therefore take place in the vertical direction on account of the axial orientation in the motor vehicle vertical direction Z. At the same time, the radial rigidity of the bearings in the motor vehicle longitudinal direction X and in the motor vehicle transverse direction Y can be designed in such a way that improved comfort is achieved in the case of driving over obstacles.

FIG. 5 shows the side view in the motor vehicle cross section Y. In the case of the side view, a straight connecting line runs through the wheel center point 23 and/or the center of mass 22 of the battery carrier. This does not mean that the respective point 22, 23 has to lie on the straight line. In a projected side view, the straight connecting line 24 runs through at least one of the two points 22, 23.

Figure 6:
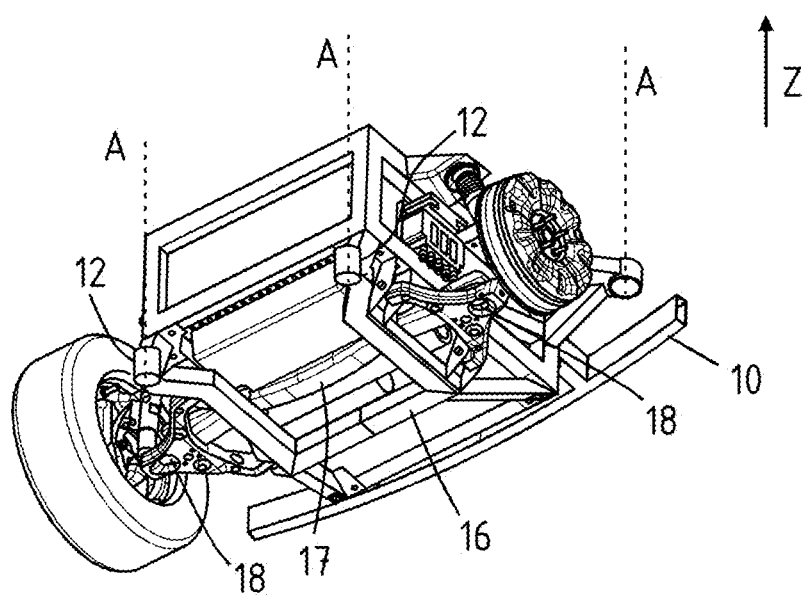
FIG. 6 shows one with regard to the suspension points with the bearing axial direction in the motor vehicle vertical direction according to at least one embodiment.

The axial orientation of the suspension points 11, 12 in the motor vehicle vertical direction Z is likewise shown once again in FIG. 6.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. An electric vehicle for the transportation of persons or loads, comprising:
 a frame structure;
 axle modules coupled to the frame structure, wherein the axle modules comprise a front axle module and a rear axle module, at least one of the axle modules has a drive or an energy source, at least one of the axle modules has two pairs of suspension points for attachment to the frame structure, and each of the two pairs of suspension points are configured at different heights in a vertical direction of the vehicle;

a connecting line that connects a first pair of the suspension points to a second pair of the suspension points, in side view, through a wheel center point offset by +100 millimeters (mm) with respect to the wheel center point in the vertical direction of the vehicle at the wheel center point or through a center of mass of a battery box; and wheels, wherein each wheel is kinematically coupled to the front axle module or the rear axle module.

2. The electric vehicle according to claim 1, wherein the at least one axle module has a battery carrier arranged centrally in the at least one axle module, and the battery carrier is an integral part of the axle module.

3. The electric vehicle according to claim 2, wherein the at least one axle module has a cooling structure for the battery carrier.

4. The electric vehicle according to claim 1, wherein the at least one axle module has an axle frame on a top portion of the axle module, and a first pair of the suspension points project laterally from the axle frame.

5. The electric vehicle according to claim 1, wherein the at least one axle module has an axle subframe in a lower region of the axle module.

6. The electric vehicle according to claim 5, wherein a second pair of the suspension points are on the axle subframe.

7. The electric vehicle according to claim 1, wherein a second pair of the suspension points are in a longitudinal direction of the vehicle, on a side of the at least one axle module, and the side is opposite to a first pair of the suspension points.

8. The electric vehicle according to claim 1, wherein the at least one axle module has a wheel hub motor.

9. The electric vehicle according to claim 1, wherein the frame structure comprises a space frame.

10. The electric vehicle according to claim 1, wherein the two pairs of suspension points are oriented in the vertical direction of the vehicle and axially separated from one another.

11. The electric vehicle according to claim 1, further comprising elastic bearings for attaching the two pairs of suspension points to the frame structure.

12. The electric vehicle according to claim 1, wherein the at least one axle module has a transverse leaf spring.

* * * * *